United States Patent
Shine

(10) Patent No.: US 6,176,073 B1
(45) Date of Patent: Jan. 23, 2001

(54) COUPLING LINK

(76) Inventor: Thomas Adam Shine, 37 Avon St., New Haven, CT (US) 06511

( * ) Notice: Under 35 U.S.C. 154(b), the term of this patent shall be extended for 0 days.

(21) Appl. No.: 09/355,569

(22) PCT Filed: Jan. 29, 1998

(86) PCT No.: PCT/GB98/00275
§ 371 Date: Sep. 23, 1999
§ 102(e) Date: Sep. 23, 1999

(87) PCT Pub. No.: WO98/34035
PCT Pub. Date: Aug. 6, 1998

(51) Int. Cl.[7] .................................................. F16G 13/18
(52) U.S. Cl. ........................ 59/84; 59/83; 59/85; 59/90; 59/93
(58) Field of Search .................. 59/84, 83, 80, 59/90, 93

(56) References Cited

U.S. PATENT DOCUMENTS

| 594,959 | * | 12/1897 | Morris | 72/80 |
| 1,403,905 | * | 1/1922 | Johnson | 72/90 |
| 1,676,966 | * | 7/1928 | Seager | 72/90 |
| 1,688,011 | * | 10/1928 | Gouverneur | 72/83 |
| 1,848,491 | * | 3/1932 | Nourse | 72/84 |
| 2,177,816 | * | 10/1939 | Wertman | 72/83 |
| 3,418,803 | * | 12/1968 | Martin | 72/90 |

FOREIGN PATENT DOCUMENTS

| 4227021 C1 | 1/1994 | (DE) . |
| WO 89/08998 | 10/1989 | (WO) . |

* cited by examiner

Primary Examiner—David Jones
(74) Attorney, Agent, or Firm—Perman & Green, LLP

(57) ABSTRACT

A coupling link (1) comprises a unitary body having a first main limb (2), a second main limb (3), and a third limb (4) which forms an open loop (6), one end of which extends between the first and second main limbs. Loading of ropes, slings or protection onto the coupling limnk (1) is simply a matter of temporarily deforming the rope or device and looping it over the third limb (4). The required unloading action is too complex for it to happen accidently. The three dimensional topology of the coupling link (1) eliminates the requirement for a spring biased gate and is therefore inherently safer than a conventional karabiner. In a preferred example, the first and second main limbs are joined to form a closed loop (5).

6 Claims, 2 Drawing Sheets

COUPLING LINK

BACKGROUND OF THE INVENTION

A karabiner is an oval or D-shaped coupling link with a closure and is an essential piece of equipment when rock climbing and mountaineering. Existing karabiner designs rely on a spring biased gate and it is this gate which is the main weakness of the karabiner. In particular, the gate can open due to the rope pressing on the gate, or when the karabiner is subjected to a sudden shock. Since the strength and safety of the karabiner is adversely affected when the gate is open, karabiners having a locking mechanism in the form of a screw-gate or bayonet fitting are available for use when safety is critical to protect against accidental opening of the karabiner gate. However, these karabiners are much more expensive, harder to use, heavier and can still open during routine use. Furthermore, karabiners in general are designed to be structurally loaded only along their major axis and are much weaker if cross-loaded, loaded in more than two directions, or loaded over a sharp edge, and ultimately may fail under these conditions.

SUMMARY OF THE INVENTION

According to the present invention, a coupling link comprises a unitary body having a closed loop and a dependent limb which is shaped so that a free end of the limb passes through the closed loop, the limb being flexibly resilient to provide a closable gap between the limb and a surface of the closed loop.

The majority of problems associated with existing karabiner designs are due to the gate. The three dimensional topology of the coupling link of the present invention eliminates the requirement for a spring biased gate and is therefore inherently safer than a conventional karabiner. Loading of ropes, slings or protection onto the coupling link is simply a matter of temporarily deforming the rope or device and looping it over the third limb. Although loading and unloading are simple actions to perform by hand, the required unloading action is too complex for it to happen accidentally. The design also makes it difficult to cross-load the coupling link. In any case, the coupling link is not particularly sensitive to the direction of loading so that simultaneous loading in several different directions is possible and much safer in comparison to conventional karabiner designs.

Preferably, the closed loop lies in a plane substantially perpendicular to a plane defined by the limb.

Preferably, one end of the limb is adapted to form a tongue which is spaced apart a predetermined distance from the closed loop. This creates a gap which just allows a loop of roping to pass over the limb.

Preferably, the limb is flexibly resilient in the plane defined by the limb.

The coupling link may be solid or hollow and made of any suitable material having a high tensile strength. The limbs may have a cross-section having any suitable shape, which may vary along the length of the limbs.

BRIEF DESCRIPTION OF THE DRAWINGS

An example of the present invention will now be described with reference to the accompanying drawings, in which.

DETAILED DESCRIPTION

Figure 1:
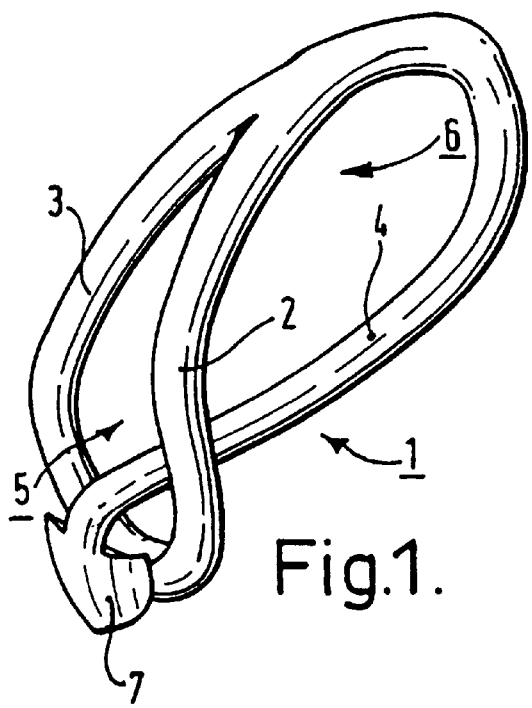
FIG. 1 shows a perspective view of a coupling link in accordance with the present invention.
Figure 2:
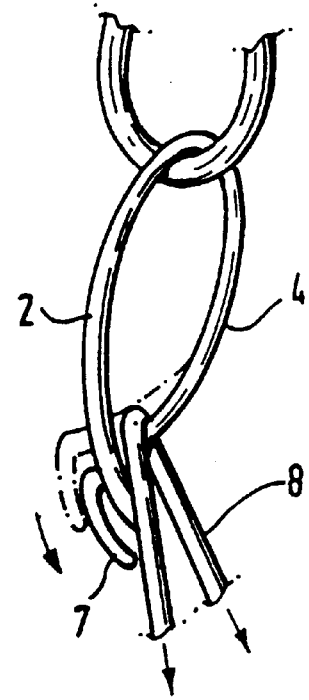
FIG. 2 shows a side view of the coupling link of FIG. 1 in an unloaded and loaded configuration.

The coupling link 1 shown in FIG. 1 is formed from aluminum alloy and comprises a first main limb 2, a second main limb 3 and a third limb 4 each of which has a generally circular cross section having the same diameter. The first and second main limbs form a closed loop 5 through which the third limb 4 extends. The third limb 4 creates an open loop 6, the free end of which is provided with a tongue projection 7 spaced apart from the body of the closed loop 5 to allow a climbing rope 8 to just pass through the gap. The tongue 7, in combination with the limbs of the closed loop 5, prevent items sliding off the third limb 4. The third limb is flexibly resilient in the plane of the open loop 6 and so when loaded tends to close the gap and bear against the proximal end of the closed loop 5. This is shown in FIG. 2.

Figure 3:
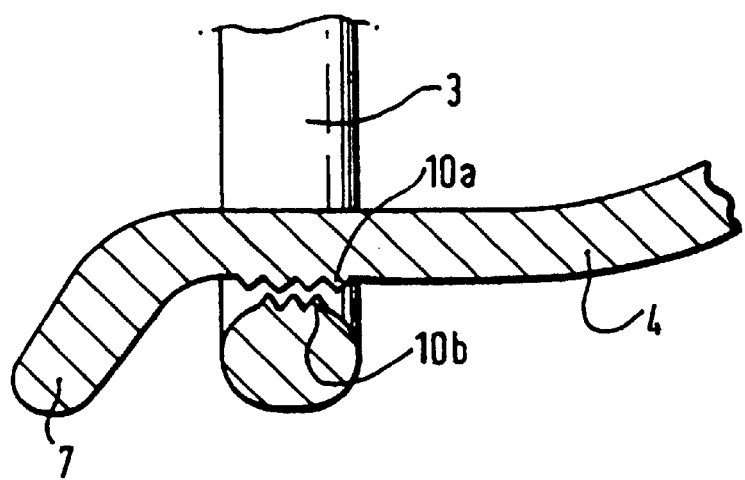
FIG. 3 shows a sectional view of a portion of the coupling link of FIG. 1 where interlocking teeth are provided.
Figure 4E:
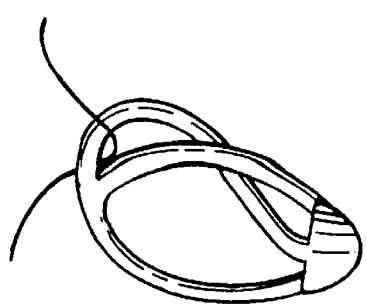
FIGS. 4a to 4e show how a rope is attached to the coupling link of FIG. 1.
Figure 4D:
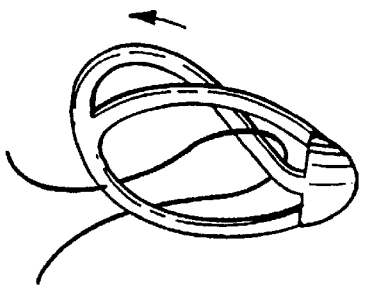
Figure 4C:
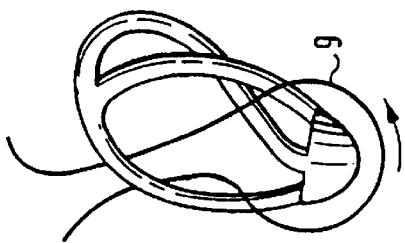
Figure 4B:
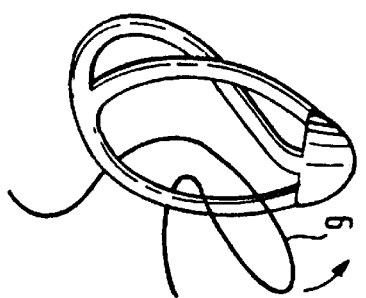
Figure 4A:
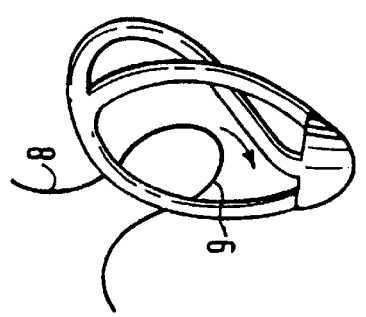
Figure 5E:
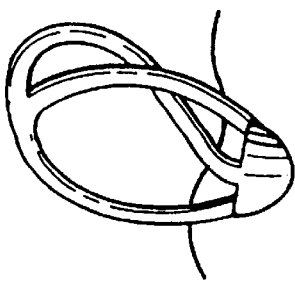
FIGS. 5a to 5e show how a rope is removed from the coupling link of FIG. 1.
Figure 5D:
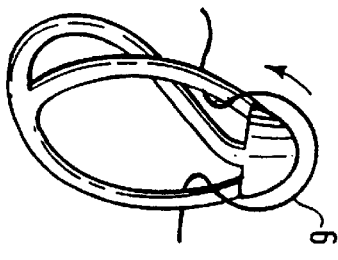
Figure 5C:
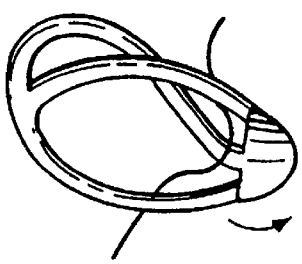
Figure 5B:
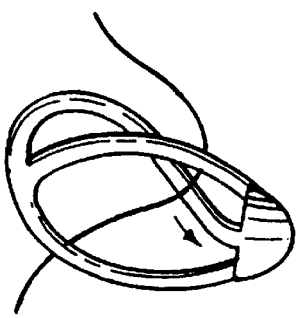
Figure 5A:
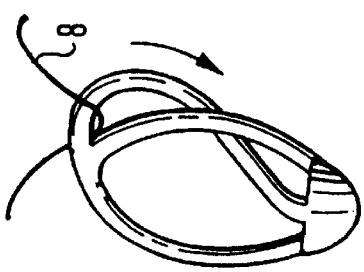

FIG. 3 shows an improvement to the basic design to include interlocking teeth 10a and 10b where the third limb 4 touches the inner surface of the closed loop 5. The function of the interlocking teeth is to help prevent the third limb 4 slipping when loaded.

FIGS. 4a to 4e show how a rope 8 is secured to the coupling link 1 by passing a loop of roping 9 from one side of the open loop 6 through the closed loop 5 and over the free end of the third limb 4. The reverse procedure for removing the rope is shown in FIGS. 5a to 5e.

What is claimed is:

1. A coupling link comprising a unitary body having a closed loop and a dependent limb which is shaped so that a free end of the limb passes through the closed loop, the limb being flexibly resilient to provide a closable gap between the limb and a surface of the closed loop, wherein in an unflexed state of the limb, a flexible member to be retained by the coupling link can be passed around the free end and through the gap.

2. A coupling link according to claim 1, in which the closed loop lies in a plane substantially perpendicular to a plane defined by the limb.

3. A coupling link according to claim 1, in which the closed loop has an inner wall, one end of the limb being adapted to form a tongue which is spaced a predetermined distance from the inner wall of the closed loop, sufficient to allow the passage of the flexible member around the limb.

4. A coupling link according to claim 1, in which the limb is flexibly resilient in a plane defined by the limb.

5. A coupling link according to claim 1, further comprising means for preventing slippage of the third limb relative to the closed loop when the coupling link is loaded.

6. A coupling link according to claim 5, in which the means for preventing slippage comprises one or more toothed projections which depend from respective facing surfaces of the limb and the closed loop.

* * * * *